United States Patent [19]

Fultz

[11] Patent Number: 5,078,365
[45] Date of Patent: Jan. 7, 1992

[54] FENCE TENSION APPARATUS

[76] Inventor: Purvis Fultz, SR Box 5E, Beryl, Utah 84714

[21] Appl. No.: 723,856

[22] Filed: Jul. 1, 1991

[51] Int. Cl.$^5$ .............................................. E04H 17/00
[52] U.S. Cl. .......................................... 256/1; 256/37; 256/47; 254/256
[58] Field of Search .................. 456/37, 42, 39, 44, 456/27, 32, 1; 254/256, 257, 261, 262, 263

[56] References Cited

U.S. PATENT DOCUMENTS

| | | | |
|---|---|---|---|
| 606,737 | 7/1898 | Probasco | 256/1 |
| 979,915 | 12/1910 | Baggett | 254/257 |
| 2,996,283 | 8/1961 | Johnson | 254/256 |
| 3,371,911 | 3/1968 | Parisien | 258/47 |
| 4,266,756 | 5/1981 | Anderson | 256/47 |

Primary Examiner—Andrew V. Kundrat
Attorney, Agent, or Firm—Leon Gilden

[57] ABSTRACT

A fence tensioning apparatus includes a central coaxially aligned support rod fixedly mounting an arcuate foot at a forward terminal end thereof, defining a concave recess to accomodate a fence post therewithin. A slider tube is slidably mounted about the support rod between the foot and a flange plate, including a bore to slidably receive an externally threaded rod therethrough. The externally threaded rod is coaxially parallel to the support rod extending rearwardly of a rear edge of the slider tube. The forward edge of the slider tube mounts a support loop thereon that pivotally mounts a clamp strap cooperative with the foot to grasp a fence web and direct the fence web to the fence post.

6 Claims, 5 Drawing Sheets

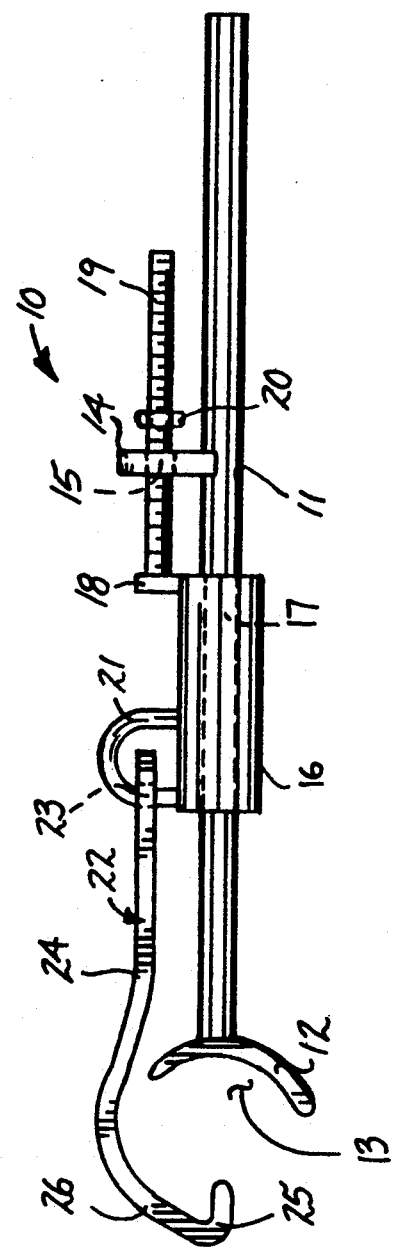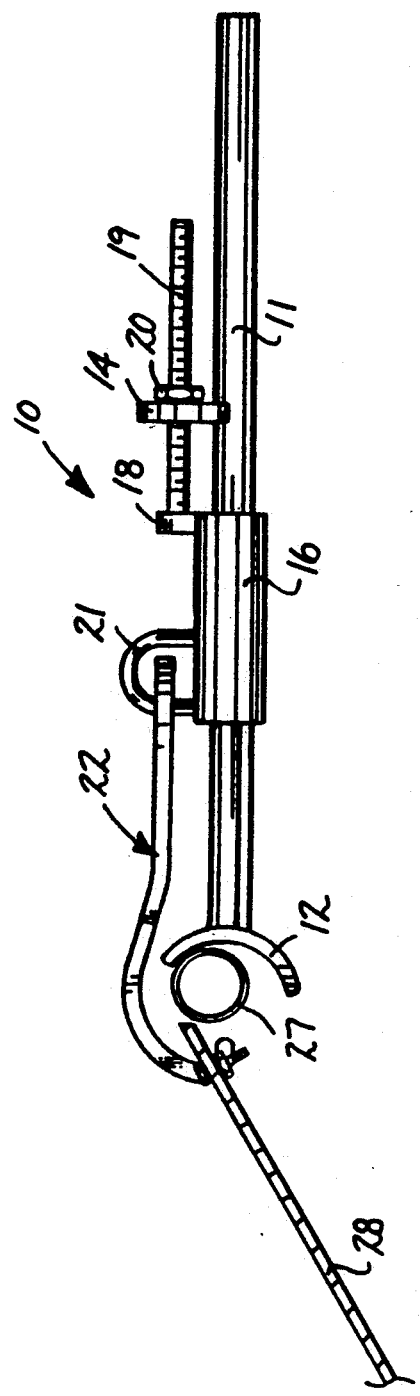

FENCE TENSION APPARATUS

BACKGROUND OF THE INVENTION

1. Field of the Invention

The field of invention relates to tool apparatus, and more particularly pertains to a new and improved fence tensioning apparatus wherein the same is directed to extend a fence web relative to a fence post to permit securement of the web relative to the post in an assembly procedure.

2. Description of the Prior Art

Various fence stretching tools are utilized in the prior art to stretch fence relative to a post for securement of the fence relative to the post. Such apparatus is exemplified in U.S. Pat. No. 3,990,682 to Bersaw wherein a jaw structure clamps a barbed wire fence strand and a main body is pivotally mounted about a support post to stretch the barbed wire relative to the post.

U.S. Pat. No. 359,168 to Miller sets forth a further barbed wire strand stretching apparatus to stretch a barbed wire strand relative to a post.

U.S. Pat. No. 3,667,729 to Hinkel sets forth a gate closure device to stretch a gate post relative to a support post.

U.S. Pat. No. 4,468,015 to Wier sets forth a further example of a wire tensioning apparatus to stretch a wire member relative to a fence post structure.

As such, it may be appreciated that there continues to be a need for a new and improved fence tensioning apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fence tensioning apparatus now present in the prior art, the present invention provides a fence tensioning apparatus wherein the same directs a fence mesh by clamping a mesh flange and directing the flange relative to a supporting post. As such, the general purpose of the present invention, which will be described subsequently in greater detail, is to provide a new and improved fence tensioning apparatus which has all the advantages of the prior art fence tensioning apparatus and none of the disadvantages.

To attain this, the present invention provides a fence tensioning apparatus including a central coaxially aligned support rod fixedly mounting an arcuate foot at a forward terminal end thereof, defining a concave recess to accommodate a fence post therewithin. A slider tube is slidably mounted about the support rod between the foot and a flange plate, including a bore to slidably receive an externally threaded rod therethrough. The externally threaded rod is coaxially parallel to the support rod extending rearwardly of a rear edge of the slider tube. The forward edge of the slider tube mounts a support loop thereon that pivotally mounts a clamp strap cooperative with the foot to grasp a fence web and direct the fence web to the fence post.

My invention resides not in any one of these features per se, but rather in the particular combination of all of them herein disclosed and claimed and it is distinguished from the prior art in this particular combination of all of its structures for the functions specified.

These has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fence tensioning apparatus which has all the advantages of the prior art fence tensioning apparatus and none of the disadvantages.

It is another object of the present invention to provide a new and improved fence tensioning apparatus which may be easily and efficiently manufactured and marketed.

It is a further object of the present invention to provide a new and improved fence tensioning apparatus which is of a durable and reliable construction.

An even further object of the present invention is to provide a new and improved fence tensioning apparatus which is susceptible of a low cost of manufacture with regard to both materials and labor, and which accordingly is then susceptible of low prices of sale to the consuming public, thereby making such fence tensioning apparatus economically available to the buying public.

Still yet another object of the present invention is to provide a new and improved fence tensioning apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of the instant invention.

FIG. 2 is an orthographic side view of the invention in association with a fence post and fence mesh web.

DESCRIPTION OF THE PREFERRED EMBODIMENT

Figure 3:
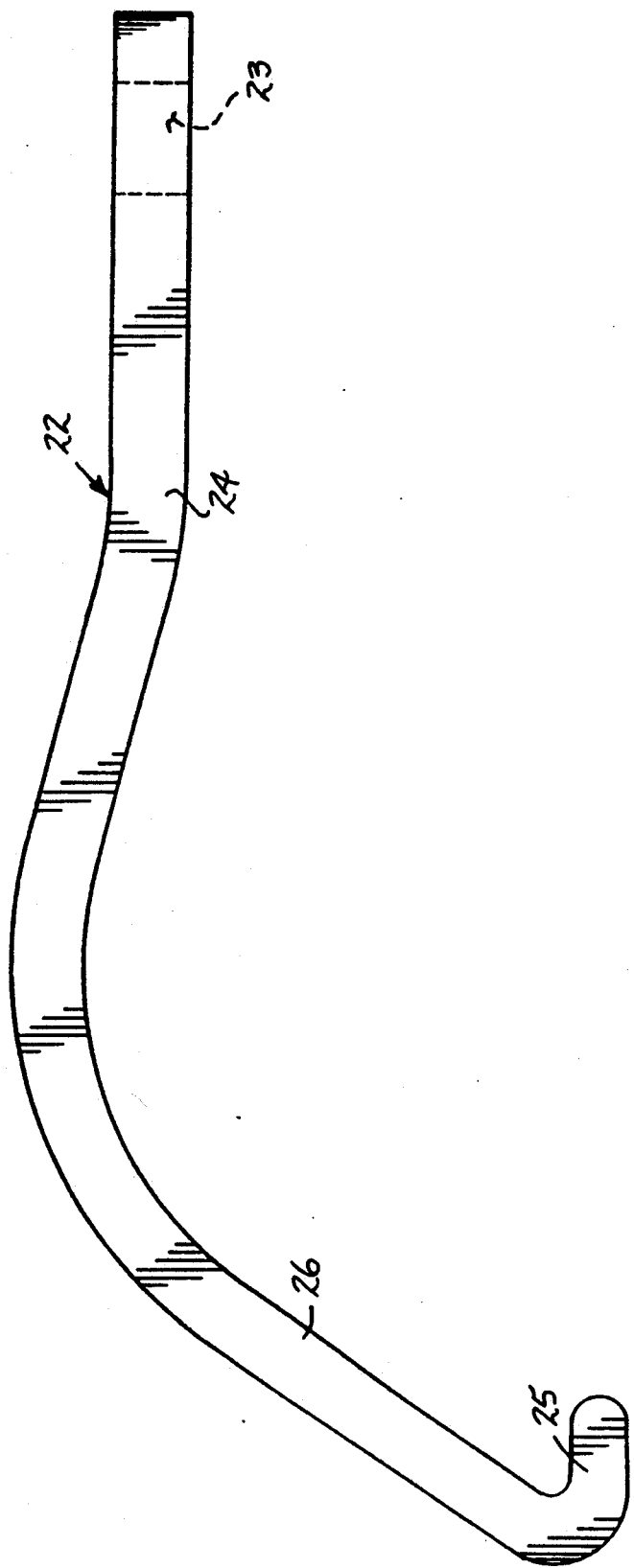
FIG. 3 is an orthographic side view of the clamp straps utilized by the tool.
Figure 4:
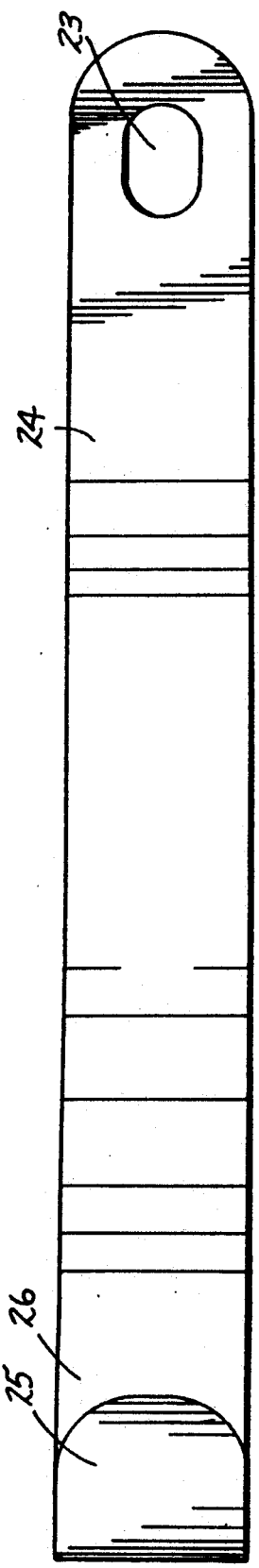
FIG. 4 is an orthographic top view of the clamp strap utilized by the tool.
Figure 5:
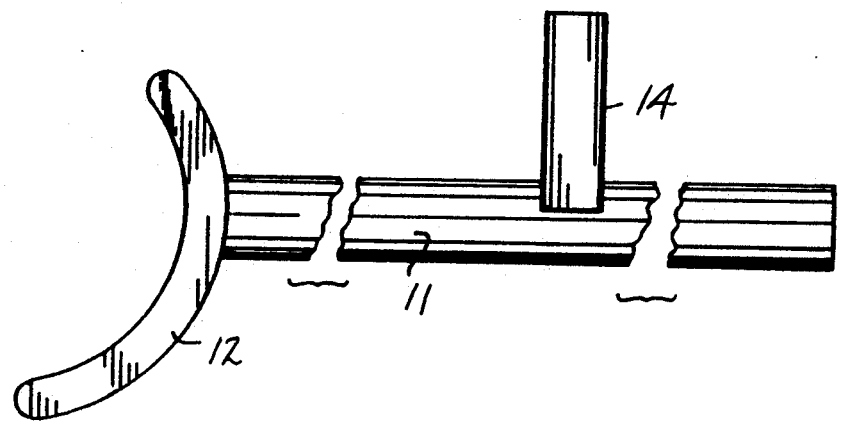
FIG. 5 is an orthographic fragmentary side view of the central support rod of the invention.
Figure 6:
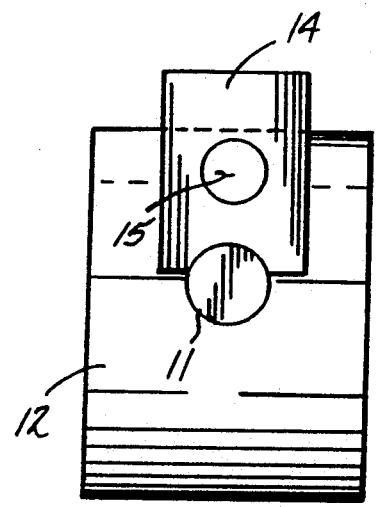
FIG. 6 is an orthographic rear view of the support rod of the invention, as set forth in FIG. 5.
Figure 8:
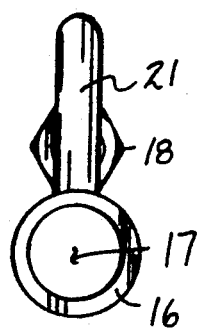
FIG. 8 is an orthographic end view of the slider tube of the invention.
Figure 7:
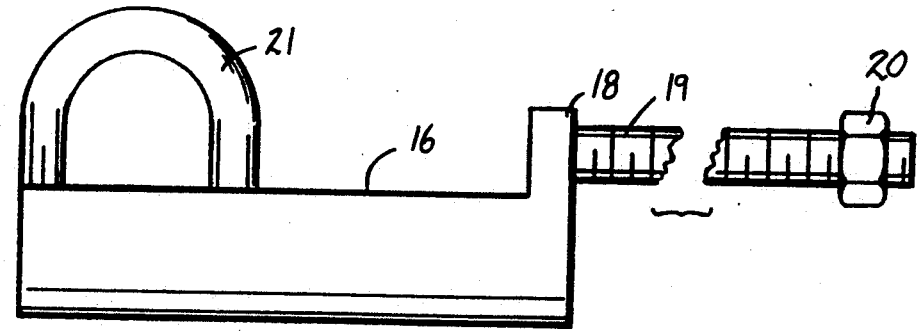
FIG. 7 is an orthographic side view of the slider tube, as illustrated in FIG. 8.

With reference now to the drawings, and in particular to FIGS. 1 to 12 thereof, a new and improved fence tensioning apparatus embodying the principles and concepts of the present invention and generally designated by the reference numerals 10 and 10a will be described.

More specifically, the fence tensioning apparatus 10 essentially comprises a central coaxially aligned support rod 11, including an arcuate foot 12 fixedly mounted to a forward terminal end of the rod 11, including a concave recess 13, with the concave recess 13 projecting oriented rearwardly and forwardly of the forward terminal end of the rod 11. The concave recess 13 is diametrically oriented in its securement to the forward terminal end of the support rod 11. A flange plate 14 is orthogonally mounted relative to the coaxially aligned support rod 11 spaced from the foot 12. The flange plate 14 includes a flange plate bore 15 directed therethrough that is oriented parallel to and spaced from the rod 11. A slider tube 16 is slidably mounted and captured about the support rod 11 between the foot 12 and the flange plate 14. A slider tube bore 17 receives the support rod 11 therethrough, wherein the slider tube bore 17 is coaxially directed through the slider tube 16. A tube flange 18 is fixedly mounted adjacent a rear edge of the slider tube 16 orthogonally oriented relative to the axis of the tube bore 17. An externally threaded rod 19 is orthogonally mounted to the tube flange 18 and extends rearwardly of the tube flange 18 slidably received through the flange plate bore 15 to arrange the externally threaded rod 19 in a parallel spaced relationship relative to the support rod 11. An internally threaded abutment member 20 is threadedly mounted about the externally threaded rod 19 on opposed side of the flange plate 14 relative to the tube flange 18.

Figure 9:
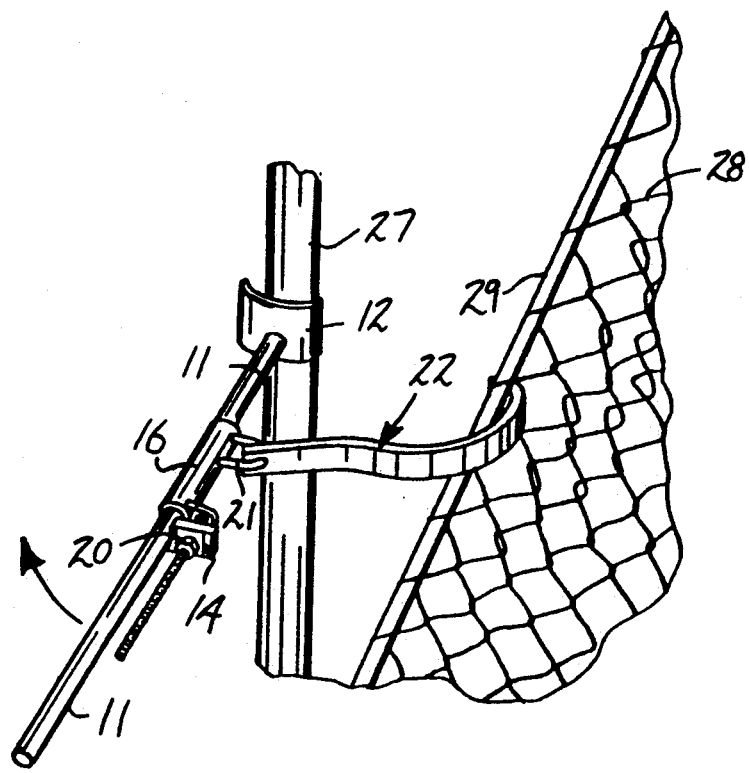
FIG. 9 is an isometric illustration of the invention in use in a first position.
Figure 10:
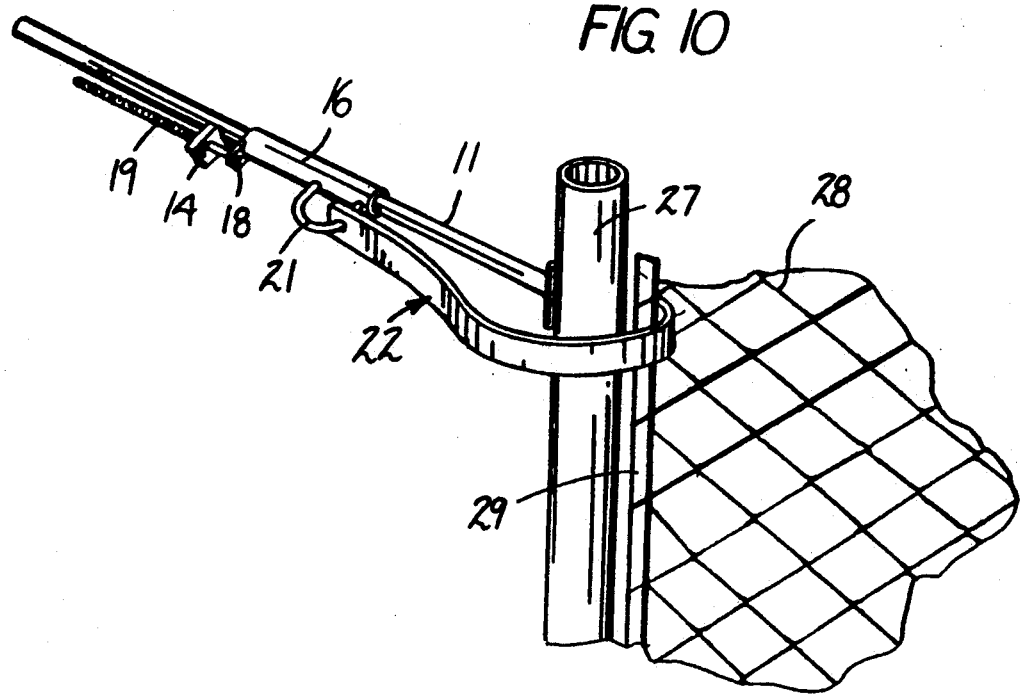
FIG. 10 is an isometric illustration of the invention in a second position.

A support loop 21 is mounted on the slider tube 16 adjacent a forward end thereof aligned with the externally threaded rod 19. A "J" shaped strap clamp 22 is mounted slidably about the support loop 21 and received therethrough through a strap bore 23. The "J" shaped clamp strap 22 includes a first strap leg 24 extending longitudinally of the support rod 11, with a second strap leg 25 of the "J" shaped strap clamp 22 directed spaced from and below the first strap leg 24 connected to the first clamp leg 24 by a connecting strap 26. In use, a fence post 27 is positioned in communication with the foot 12, as illustrated in FIG. 9, with the clamp strap 22 secured about an end plate 29 of a fence web 28. Rotation of the support rod 11 relative to the post 27 effects stretching and displacement of the web and end plate 29 relative to the post 27 to permit a clamp to be secured about the end plate 29 and the fence post 27 for securement of the fence web 28 relative to the fence post 27.

Figure 11:
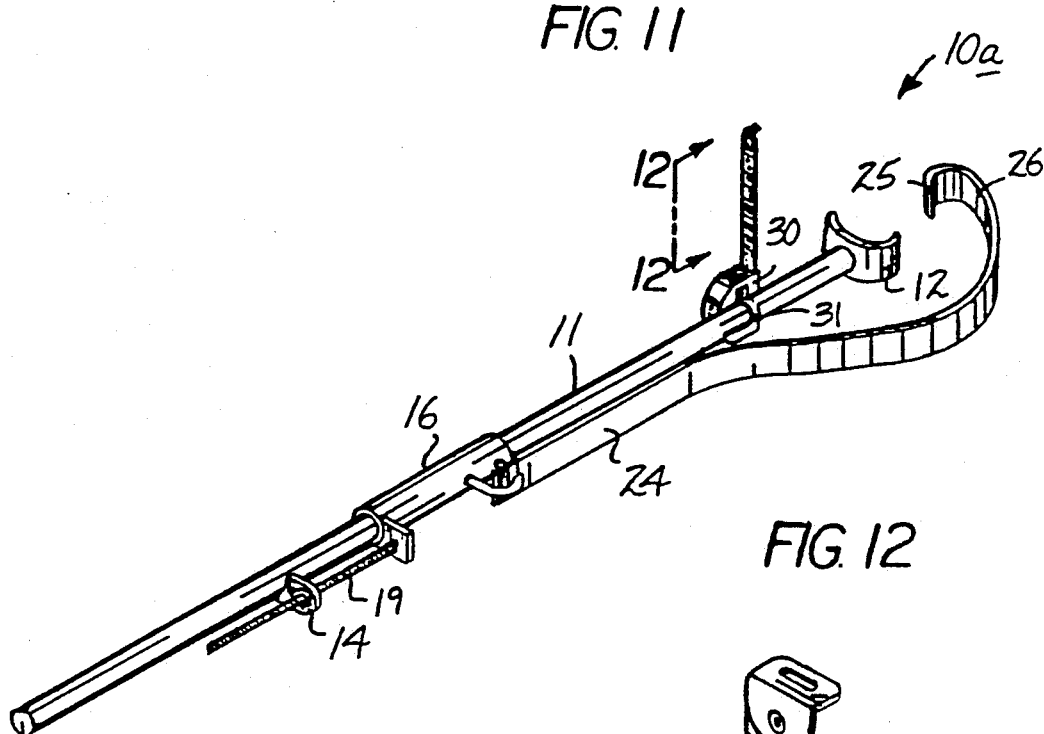
FIG. 11 is an isometric illustration of a modification of the invention.
Figure 12:
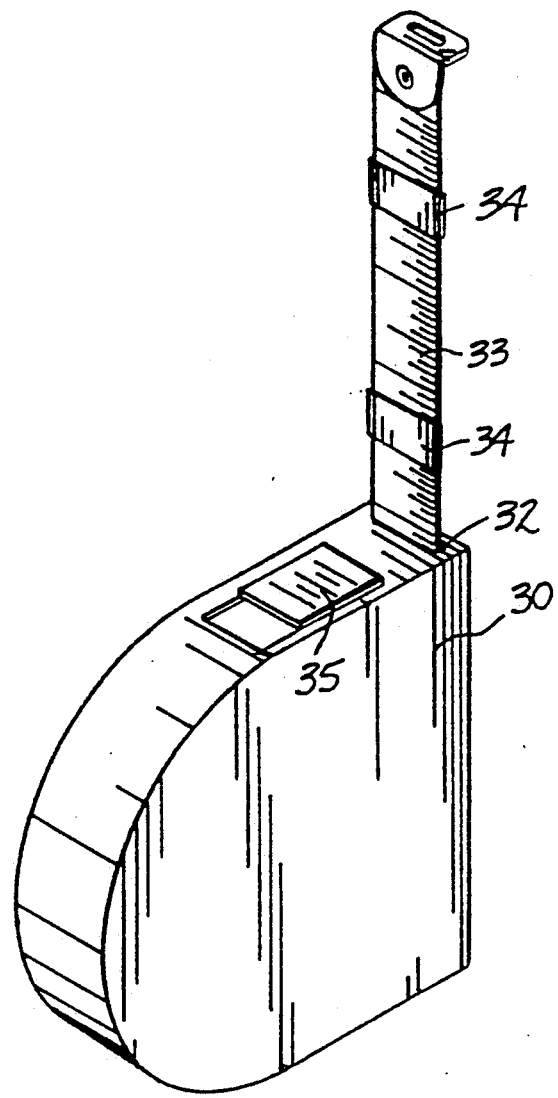
FIG. 12 is an isometric enlargement of the tape structure as utilized and depicted in FIG. 11, taken along the lines 12—12 in the direction indicated by the arrows.

FIGS. 11 and 12 illustrate a modified apparatus 10a that include a retractable measuring tape housing 30 mounted to the support rod 11 adjacent the foot 12 secured to the support rod 11 by mounting clamp 31. The housing 30 includes a housing tape opening 32 oriented orthogonally relative to the foot 12 and the flange plate 14 to project a flexible measuring tape 33 upwardly to position an upper terminal end of the measuring tape to permit repetitive orientation of the foot 12 relative to a post and thereby position a securement clamp (not shown) to secure the web 28 relative to a fence post 27 in a like manner in a duplicating relationship from spaced fence posts 27. To this end, slide rings 34 are positioned on a flexible tape 33 frictionally engaged about the measuring tape to permit sliding of a slide ring 34 relative to the tape 33 and thereby permit visual orientation of the support rod 11 at a predetermined fixed orientation relative to the upper terminal end of the support rod.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fence tensioning apparatus, comprising in combination, an elongate coaxially aligned support rod, including a forward terminal end spaced from a rear terminal end, the forward terminal end includes an arcuate foot fixedly mounted to the forward terminal end, the arcuate foot defining a concave recess, the concave recess projecting exteriorly and forwardly of the forward terminal end of the support rod, and a flange plate fixedly mounted to the support rod orthogonally oriented relative to an axis defined by the support rod, the flange plate including a flange plate bore directed through the flange plate and arranged parallel relative to the support rod spaced apart a predetermined spacing, and a slider tube slidably mounted on the support rod captured between the flange plate and the arcuate foot, the slider tube including a tube bore coaxially directed through the slider tube receiving a support rod therethrough, and the slider tube including a tube rear end and a tube forward end, the tube rear end including an externally threaded rod fixedly mounted to the tube rear end arranged parallel relative to the support rod and slidably received through the flange plate bore, and an internally threaded abutment member threadedly mounted about the externally threaded rod on an opposed side of the flange plate relative to the slider tube, and a "J" shaped clamp strap pivotally mounted to the tube forward end, the "J" shaped clamp strap projecting forwardly of the arcuate foot and pivotally mounted relative to the slider tube.

2. An apparatus as set forth in claim 1 wherein the tube forward end includes a support loop, the support loop aligned with the externally threaded rod, and the "J" shaped clamp strap including a strap bore, the strap bore receiving the support loop therethrough.

3. An apparatus as set forth in claim 2 wherein a "J" shaped clamp strap includes a first strap leg, with the first strap leg pivotally mounted at a rear strap end to the support loop and a forward strap end including a connecting strap, the connecting strap fixedly secured to a second strap leg, the second strap leg projecting in a spaced relationship relative to the first strap leg.

4. An apparatus as set forth in claim 3 wherein a first strap leg is defined by a first length and the second strap leg is defined by a second length, wherein the second length is substantially less than the first length.

5. An apparatus as set forth in claim 4 including a measuring tape housing, the measuring tape housing including a mounting clamp, the mounting clamp mounted about the support rod adjacent the arcuate foot, and the mounting tape housing including a housing tape opening, the housing tape opening oriented ninety degrees relative to the flange plate, and a flexible measuring tape retractably mounted within the measuring tape housing projecting through the housing tape opening.

6. An apparatus as set forth in claim 5 including at least one friction slide ring frictionally and slidably mounted about the measuring tape to provide a visual indicator of determined distance from the at least one slide ring to a free terminal end of the measuring tape.

* * * * *